United States Patent
Ishida (10) Patent No.: US 9,033,354 B2
(45) Date of Patent: May 19, 2015

(54) STEP DEVICE FOR VEHICLE

(71) Applicant: AISIN SEIKI KABUSHIKI KAISHA, Kariya-shi (JP)

(72) Inventor: Toshihiko Ishida, Niwa-gun (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/202,320

(22) Filed: Mar. 10, 2014

(65) Prior Publication Data

US 2014/0284896 A1    Sep. 25, 2014

(30) Foreign Application Priority Data

Mar. 21, 2013    (JP) ................................. 2013-058399

(51) Int. Cl.
*B60R 3/00*    (2006.01)
*B60J 5/06*    (2006.01)

(52) U.S. Cl.
CPC ..... *B60R 3/00* (2013.01); *B60J 5/06* (2013.01)

(58) Field of Classification Search
USPC ................................. 280/163–166
See application file for complete search history.

(56) References Cited

U.S. PATENT DOCUMENTS

| | | | |
|---|---|---|---|
| 6,789,808 B2 * | 9/2004 | Yang | 280/47.24 |
| 7,159,930 B2 * | 1/2007 | Yokomori et al. | 296/155 |
| 7,585,014 B2 * | 9/2009 | Nishimura et al. | 296/155 |
| 2008/0238020 A1 * | 10/2008 | Okada et al. | 280/166 |
| 2012/0261894 A1 | 10/2012 | Ishida et al. | |

FOREIGN PATENT DOCUMENTS

JP    2011-105263 A    6/2011

* cited by examiner

*Primary Examiner* — John Walters
*Assistant Examiner* — James Triggs
(74) *Attorney, Agent, or Firm* — Buchanan Ingersoll & Rooney PC (57) ABSTRACT

A step device for a vehicle includes a step member, a drive member provided at the step member and configured to drive a slide door to open and close, the step member including a metal-made rail portion configured to be fixed to a vehicle body and configured to guide the slide door to move at an opening and closing operation of the slide door, and a resin-made step main body integrally including a step panel, a rail fitting portion protruding from the step panel to be fitted onto an outer surface of the rail portion, and a drive member setting portion to which the drive member is set. The resin-made step main body and the metal-made rail portion form a guide rail. The guide rail is configured to guide the slide door to move over an entire range of the opening and closing operation of the slide door.

7 Claims, 6 Drawing Sheets

STEP DEVICE FOR VEHICLE

CROSS REFERENCE TO RELATED APPLICATIONS

This application is based on and claims priority under 35 U.S.C. §119 to Japanese Patent Application 2013-058399, filed on Mar. 21, 2013, the entire content of which is incorporated herein by reference.

TECHNICAL FIELD

This disclosure generally relates to a step device for a vehicle.

BACKGROUND DISCUSSION

Figure 7:
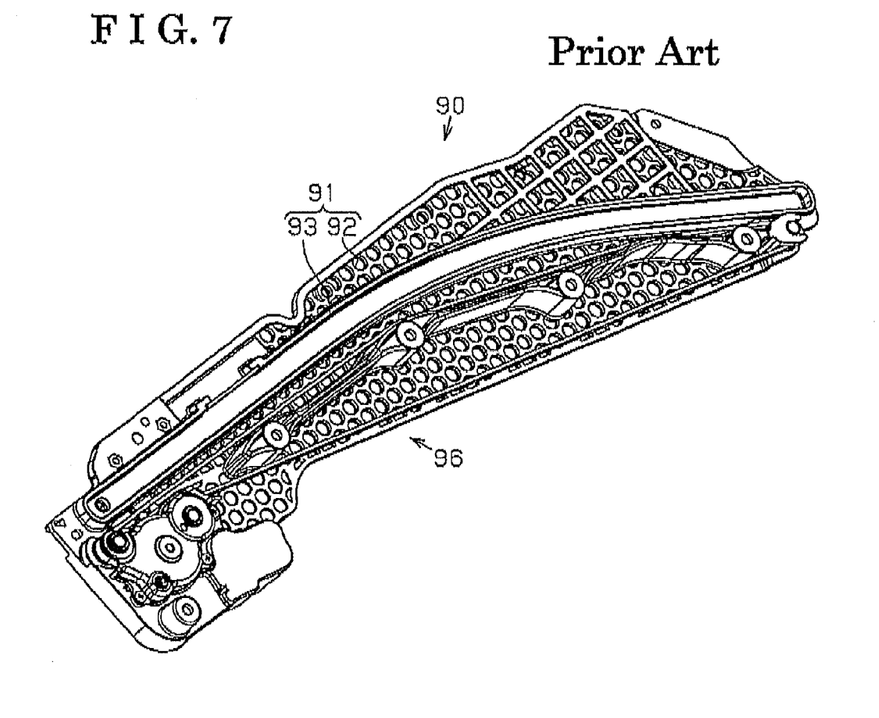
FIG. 7 is a perspective view of a known structure.

A known step device for a vehicle is disclosed in JP2011-105263A (hereinafter referred to as Patent reference 1). As illustrated in FIG. 7, a step device 90 for vehicle includes a step member 91 made from a resin member, and a drive member 96 provided at a bottom portion of the step member 91. The step member 91 integrally includes a step panel 92 formed in a substantially flat plate shape and a guide rail 93 formed in a substantially U-shape extending downward from a bottom surface of the step panel 92.

The step panel 92 is extended in a substantially horizontal manner in a state mounted on a vehicle to serves as a foot step for a passenger who ingresses and egresses a door opening. On the other hand, a guide rail 93, which is for guiding a movement of a slide door to open and close the door opening, extends basically in a front-rear direction of the vehicle. The drive member 96 is positioned inward in a vehicle width direction relative to the guide rail 93. The drive member 96 is linked to the slide door to electrically drive the slide door (drive the opening and closing of the slide door).

According to the known construction, the number of parts and weight can be reduced compared to a step member which is, for example, obtained by joining a step panel and a guide rail which are made of metal, for example, by welding.

A process for assembling in a well-fitting manner of the slide door at a vehicle manufacturer, generally, is conducted after the slide door is welded to a metal plate prior to a coating process (from electrodeposition coating to finish coating). That is, at the vehicle manufacturer, a slide door is mounted to a vehicle body which is in a metal plate state, the coating is applied to the slide door and the vehicle body, and the coated slide door and the vehicle body are baked in a drying furnace which is at the temperature around 200 degrees Celsius. Thus, according to Patent reference 1, for the purpose of assembling the slide door in a well-fitting manner prior to the coating process, it is necessary that the step device 90 for vehicle is mounted on the vehicle body. However, because the step member 91 is made of resin which does not resist the high temperature heat in the drying furnace and because the drive member 96 (e.g., electric motor) is mounted, a specialized part, which is for assembling the slide door in a well-fitting manner, that resists the high temperature heat in the drying furnace is mounted on the vehicle body at this stage. Then, after the completion of the coating process, the specialized part is removed to be replaced by the step device 90 for vehicle.

Accordingly, the man-hours, or operation time increases by the time for replacing the specialized part by the step device 90. Particularly, despite assembling the slide door in a well-fitting manner with a predetermined accuracy using the specialized part in the process for assembling the slide door in a well-fitting manner, because the specialized part, which is the premise, or base of the accuracy, is replaced by the step device 90 for vehicle, the fine adjustment to satisfy the predetermined accuracy of the assembling in the well-fitting manner needs to be redone, which further increases the man-hours, or operation time.

A need thus exists for a step device for a vehicle which is not susceptible to the drawback mentioned above.

SUMMARY

In light of the foregoing, the disclosure provides a step device for a vehicle, which includes a step member configured to be provided at a vehicle body, a drive member provided at the step member and configured to be linked to a slide door opening and closing a door opening formed at the vehicle body, the drive member configured to drive the slide door to open and close, the step member including a metal-made rail portion configured to be fixed to the vehicle body and configured to guide the slide door to move at an opening and closing operation of the slide door, and the step member including a resin-made step main body integrally including a step panel configured to serve as a foot step for a passenger that ingresses and egresses through the door opening, a rail fitting portion protruding from the step panel to be fitted onto an outer surface of the rail portion, and a drive member setting portion to which the drive member is set. The resin-made step main body and the metal-made rail portion form a guide rail. The guide rail is configured to guide the slide door to move over an entire range of the opening and closing operation of the slide door.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of a step device for a vehicle of the disclosure will be explained with reference to illustrations of the disclosure as follows.

A step device for a vehicle according to a first embodiment will be explained referring to FIGS. 1 to 4. Hereinafter, directions, such as "front/rear", "upward/downward", "inward/outward", or the like, correspond to an orientation of the vehicle. That is, a front-rear direction of the vehicle is referred to as a front-rear direction. Upward and downward in a vehicle height direction are referred to as upward and downward, respectively. An inward in a vehicle width direction which is directed towards inside the vehicle compartment is referred to as a vehicle inward. An outward in the vehicle with direction which is directed towards outside the vehicle is referred to as a vehicle outward.

Figure 1:
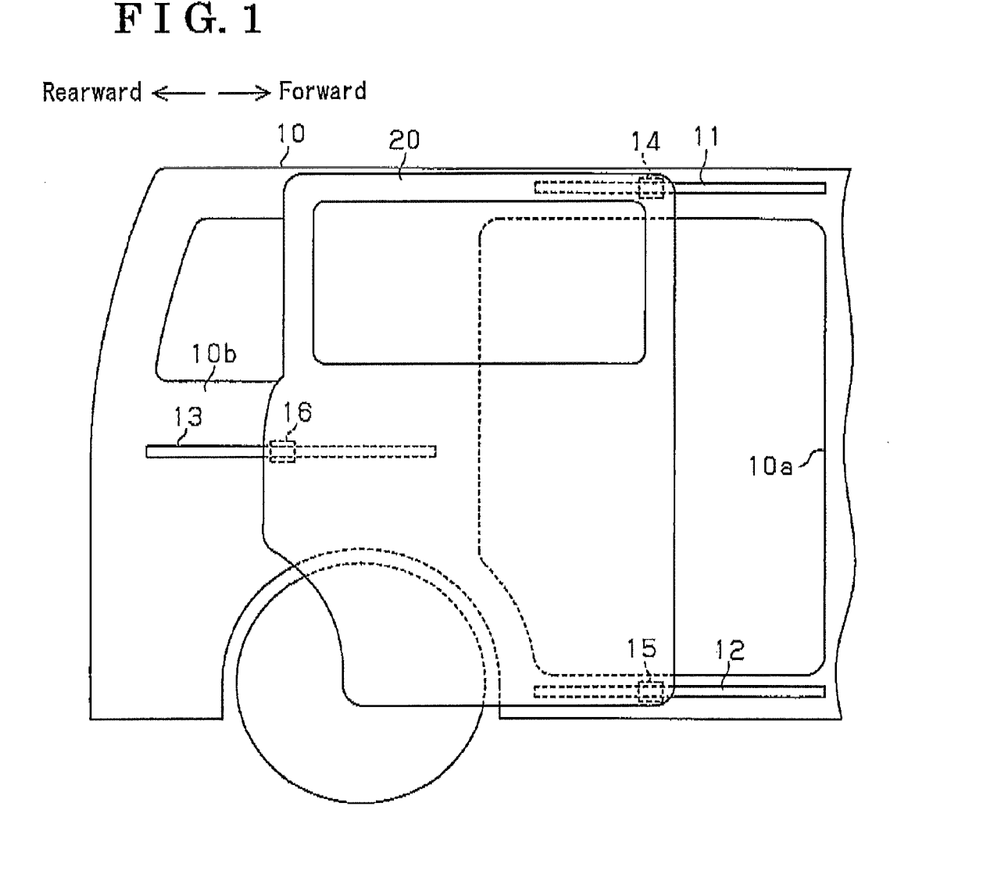
FIG. 1 is a lateral view of a vehicle to which a step device for a vehicle according to embodiments of the disclosure is mounted.

As illustrated in FIG. 1, a vehicle body 10 is provided with an upper rail 11, a lower rail 12 serving as a guide rail, and a center rail 13. The upper rail 11 extends in a front-rear direction along an upper rim of a door opening 10a formed at a side portion of the vehicle body 10. The lower rail 12 extends in a front-rear direction along a lower rim of the door opening 10a. The center rail 13 extends in a front-rear direction at a quarter panel 10b provided at a rear of the door opening 10a. A slide door 20 is movably supported in a front-rear direction by the upper rail 11, the lower rail 12, and the center rail 13, via guide roller units 14, 15, 16, respectively. The slide door 20 opens and closes the door opening 10a by moving in the front-rear direction while sliding the guide roller units 14, 15, 16 on the upper rail 11, the lower rail 12, and the center rail 13, respectively.

Figure 2:
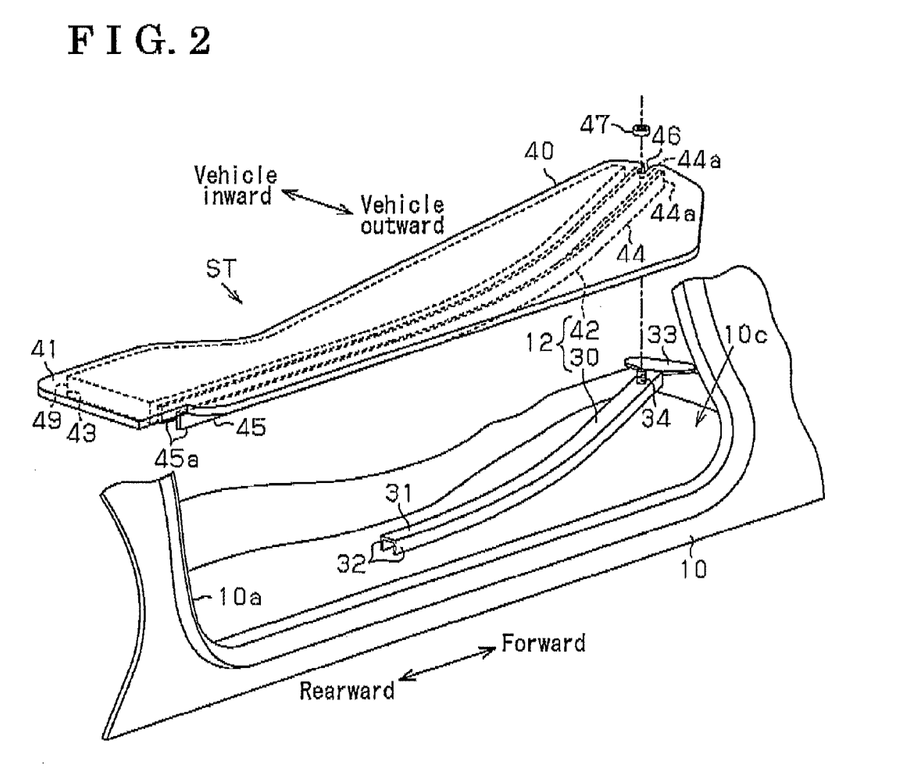
FIG. 2 is an exploded perspective view of the step device for the vehicle according to a first embodiment disclosed here.

Constructions of the lower rail 12 and the surrounding structures of the lower rail 12 will be explained hereinafter. As illustrated in FIG. 2, the vehicle body 10 is provided with an accommodating recessed portion 10c positioned lower than a vehicle floor surface and facing, or looking out on the door opening 10a. A rail portion 30 made of metal is secured to the vehicle body 10. The rail portion 30 extends in a front-rear direction over the accommodating recessed portion 10c at a position closer to a vehicle front. The rail portion 30 includes a cover wall portion 31 formed in a substantially elongated shape extending in a front-rear direction and a pair of side wall portions 32 extending downward from opposite ends of the cover wall portion 31, the opposite ends positioned spaced apart from each other in the vehicle width direction, and thus is formed in a substantially U-shape that opens downward in cross-section. The rail portion 30 is fixed to the vehicle body 10, for example, by welding via an attachment portion 33 that is provided at a front end of the rail portion 30 and formed in a substantially butterfly shape. A stud bolt 34, serving as a positioning portion and a fastening member, is fixed to the cover wall portion 31, for example, by implanting (and welding) at a rear of the attachment portion 33 in a vehicle front-rear direction. The stud bolt 34 extends in an axially upward direction.

Further, a step main body 40 made of resin is attached to the vehicle body 10 in a manner to substantially close the accommodating recessed portion 10c from the top. The step main body 40 integrally includes a step panel 41, a rail constituting portion 42, and a drive member setting portion 43. The step panel 41 is formed in a substantially flat plate shape that extends in a substantially horizontal direction over the accommodating recessed portion 10c. The rail constituting portion 42 protrudes downwardly from the step panel 41. The drive member setting portion 43 is formed at a bottom surface of the step panel 41. A drive member 49 including, for example, an electric motor and an operation mechanism primarily is provided at the drive member setting portion 43. The drive member 49 is linked, or connected to the slide door 20 and electrically moves (actuates to move) the slide door 20 (opening-closing actuation of the slide door 20).

The step panel 41 is positioned facing, or looking out on the door opening 10a and serves as a foot step for a passenger who ingresses and egresses the door opening 10a. The rail constituting portion 42 structures the lower rail 12 together with the rail portion 30. A front portion of the rail constituting portion 42 forms a rail fitting portion 44 and a rear portion of the rail constituting portion 42 forms a resin-made rail portion 45.

Figure 3:
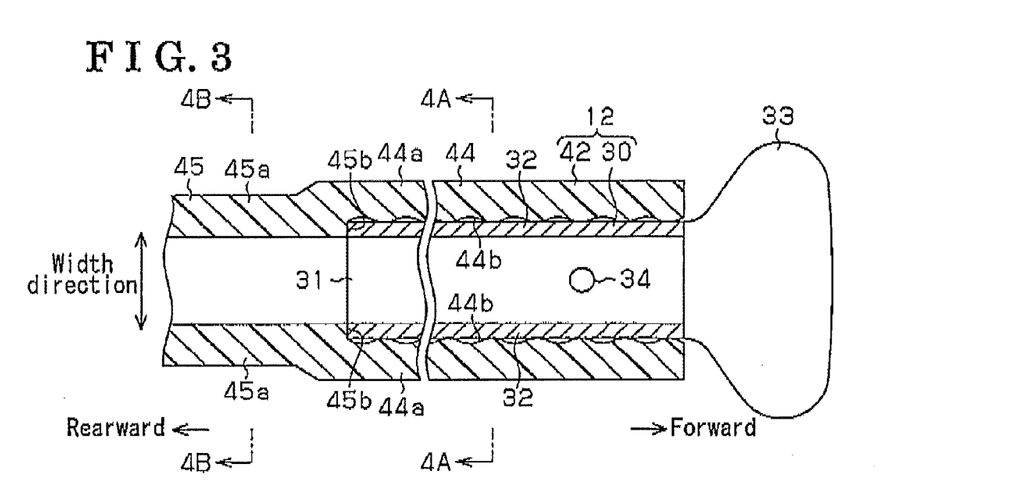
FIG. 3 is a cross-sectional view taken on line 3-3 in FIG. 4.

As illustrated in FIG. 3, the rail fitting portion 44 extends in a front-rear direction of the rail portion 30 to substantially accord to (to be substantially the same length with) an entire range (entire length) of the rail portion 30 in the front-rear direction, and overlaps with the entire range of the rail portion 30 in the front-rear direction. The rail fitting portion 44 includes a pair of support wall portions 44a that sandwich the rail portion 30 in a vehicle width direction. Each of the support wall portions 44a includes a concave-convex portion (i.e., serving as a recess-protrusion portion) 44b which is recessed and protruded in the vehicle width direction. The concave-convex portion 44b includes concaves and convexes each arranged alternately. The support wall portion 44a partially contacts an outer surface of the side wall portion 32 (rail portion 30) with pressure via the concave-convex portion 44b. That is, the rail constituting portion 42 (step main body 40) is fixed to and supported by the rail portion 30 by fitting the rail fitting portion 44 onto the outer surface of the rail portion 30 in a manner that the concave-convex portions 44b partially contact the outer surface of the side wall portions 32, respectively, with pressure.

The resin-made rail portion 45 is seamlessly formed at a rear end of the rail fitting portion 44 to extend in the front-rear direction at a rear of the vehicle. The resin-made rail portion 45 includes a pair of side wall portions 45a facing each other and spaced apart from each other in the vehicle width direction. An opening formed by the side wall portions 45a is reduced in the vehicle width direction via steps 45b to which rear end surface of the side wall portions 32 contact or come to close, respectively. The step 45b is configured to make an inner surface of the side wall portion 45a and an inner surface of the side wall portion 32 be substantially planar (be flush with each other).

As illustrated in FIG. 2, a positioning groove 46 that opens in a vehicle height direction and opposing to the stud bolt 34 is formed at a front end of the step panel 41. A depth direction of the positioning groove 46 extends in a vehicle rear direction along the rail fitting portion 44 and a rear end of the positioning groove 46 is closed. The step main body 40 is fixed to the rail portion 30 by inserting the stud bolt 34 into the positioning groove 46 while fitting the rail fitting portion 44 onto the outer surface of the rail portion 30 and by threadedly engaging a nut 47 to an end portion of the stud bolt 34 that penetrates through the positioning groove 46. In those circumstances, a positional relationship of the step main body 40 relative to the rail portion 30 is determined with the stud bolt 34, that is inserted into the positioning groove 46, as a reference point. The rail portion 30 and the step main body 40 structure a step member ST.

According to the embodiment, a quick nut, which only needs linear insertion of the stud bolt 34 when fastening and requires a rotational operation only when removing (unfastening), is adopted as the nut 47. Further, the step main body 40 which is, for example, fixed to the rail portion 30 is fastened to the vehicle body 10 side by means of plural fastening bolts. The quick nut is adopted as the nut 47 for the purpose of avoiding involved operation and use of additional tool to rotate and fasten the nut in addition to a specialized tool to rotate and fasten the fastening bolt when fixing the step main body 40.

Figure 4A:
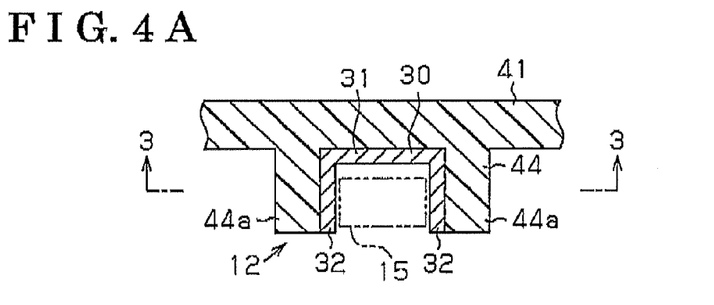
FIG. 4A is a cross-sectional view taken on line 4A-4A in FIG. 3.
Figure 4B:
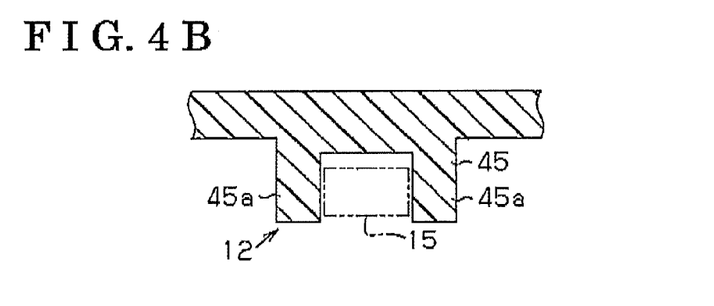
FIG. 4B is a cross-sectional view taken on line 4B-4B in FIG. 3.

As illustrated in FIGS. 4A and 4B, the guide roller unit 15 sliding on the lower rail 12 slides on inner surfaces (i.e., surfaces facing each other) of the side wall portions 32 when located within a range of the rail portion 30 (rail fitting portion 44). The guide roller unit 15 slides on inner surfaces (i.e., surfaces facing each other) of the side wall portions 45a when located within a range of the resin-made rail portion 45. The rail portion 30 and the rail constituting portion 42 cooperate each other to structure the lower rail 12. The rail portion 30 extends in a part of the range of the lower rail 12.

When the guide roller unit 15 is positioned within the range of the rail portion 30 (front portion of the lower rail 12), the slide door 20 is located within a range from a fully closed state to a predetermined half-open state. In those circumstances, the rail portion 30 guides the slide door 20 to move within the range from the fully closed state to the predetermined half-open state. When the guide roller unit 15 is positioned within the range of the resin-made rail portion 45 (rear portion of the lower rail 12), the slide door 20 is located within the range from the predetermined half-open state to a fully open state. The resin-made rail portion 45 guides the slide door 20 to move from the predetermined half-open state to the fully open state.

Accordingly, with the structure that the rail portion 30 is secured to at least the vehicle body 10, the slide door 20 is assumed to be capable of opening and closing within the range from the fully closed state to the predetermined half-open state. The predetermined half-open state is set on the basis of an opening amount of the slide door 20 through which a coating gun can move back-and-forth at a coating process (from electrodeposition coating to finish coating) after the assembling of the slide door 20 in a well-fitting manner. Further, a thickness of the rail portion 30 is determined on the basis of the minimum strength for guiding the slide door 20 to move temporarily even before the rail fitting portion 44 is fitted. In other words, the strength for guiding the slide door 20 to move in a normal use is ensured in a state where the rail portion 30 and the rail fitting portion 44 are fit to one another. Further, fixing strength, or rigidity of the rail portion 30 by the attachment portion 33 is set at a level of the strength that is the minimum for guiding the slide door 20 to move temporarily even before fastening to the step main body 40. In other words, the fixing strength of, for example, the rail portion 30 for guiding the slide door 20 to move in a normal use is ensured by a cooperation with the step main body 40 that is fastened to the vehicle body 10.

Operations of the step device for the vehicle according to the embodiment will be explained as follows. The step member ST includes the rail portion 30 made of metal and the step main body 40 made of resin and separately formed from the rail portion 30. The rail portion 30 fixed to the vehicle body 10 can guide the slide door 20 to open and close within the range from the fully closed state to the predetermined half-open state as it is. That is, by fixing the rail portion 30 only to the vehicle body 10 in a metal plate state, the slide door 20 can be assembled in a well-fitting manner with predetermined accuracy prior to the coating process (from electrodeposition coating to the finish coating). Then, after the completion of the coating process, by placing the step main body 40 to which the drive member 49 is pre-mounted onto the rail portion 30 from the top to, for example, fit the rail fitting portion 44 of the step main body 40 onto the outer surface of the rail portion 30, the lower rail 12 is structured together with the rail portion 30. Thus, a mounting operation for the step device for the vehicle is completed.

As explained above, according to the construction of the embodiment, the following advantages and effects can be attained. First, according to the construction of the embodiment, in the mounting operation of the step device for the vehicle, because a replacing operation of the parts is unnecessary, the operation time for mounting the step device for the vehicle to the vehicle body 10 can be further reduced. Further, because the precision, or accuracy when assembling the slide door 20 in a well-fitting manner basically does not change, the operation time for fine adjustment of the assembling state to be in a well-fitting manner thereafter can be reduced. Because of the reduction of the operation time, the manufacturing costs can be reduced.

Second, according to the embodiment, because the positional relationship of the rail portion 30 and the step main body 40 can be determined by the stud bolt 34 that is inserted to be positioned in the positioning groove 46, changes in the precision of the assembling in a well-fitting manner of the slide door 20 after attaching the step main body 40 can be restrained.

Third, according to the embodiment, because the rail portion 30 extends only within a part of the lower rail 12, the amount of metal member (rail portion 30) used can be reduced compared to the structure, for example, that the rail portion 30 extends in the substantially entire length of the lower rail 12. Thus, the weight can be further reduced for the step device for the vehicle with the predetermined strength.

Fourth, according to the embodiment, because the rail fitting portion 44 partially contacts the outer surface of the rail portion 30 via the concave-convex portions 44b with pressure, the rail fitting portion 44 firmly connects to the rail portion 30 while restraining the deformation of the rail portion 30.

Fifth, according to the embodiment, because the rail portion 30 extends only within a part of the range, or the length of the lower rail 12, the rail portion 30 may be inserted into the rail fitting portion 44, for example, from the rear of the vehicle to fit the rail portion 30 and the rail fitting portion 44 one another. Thus, degree of freedom of an assembling direction can be enhanced.

Sixth, according to the embodiment, because the position of the step main body 40 in a front-rear direction is adjustable relative to the rail portion 30 within a range of the positioning groove 46 through which the stud bolt 34 can be inserted, the step main body 40 can be fixed to the rail portion 30 more smoothly while absorbing assembly error of the step main body 40 and the rail portion 30. Further, even when the step main body 40 having different linear coefficient of expansion from the rail portion 30 made of metal expands and contracts by, for example, thermal expansion relative to the rail portion 30, the expansion and contraction can be absorbed within the range of the positioning groove 46.

Seventh, according to the embodiment, because the step device for the vehicle is structured by the combination of the rail portion 30 made of metal and the step main body 40 made of resin, the slide door 20 can be assembled in a well-fitting manner with the predetermined precision and the weight and the number of the parts of the step device for the vehicle can be reduced.

Eighth, according to the embodiment, because the quick nut which does not require the use of a tool is adopted as the nut 47, the involved operation that requires a specialized tool for rotating and fastening the nut can be avoided in addition to a specialized tool to rotate and fasten the fastening bolt when fixing the step main body 40. Thus, misuse of the tool during the assembling operation and being unaware of not fastening the bolt can be restrained.

Ninth, according to the embodiment, because the stud bolt 34 is provided at the rail portion 30 to be fastened to the step main body 40, for example, an interference of an end portion of the fastening bolt that is otherwise protruding into the rail portion 30 with the guide roller unit 15 can be avoided. Further, an increase in size of the rail portion 30 in a vehicle height direction for avoiding the interference of, for example, the end portion of the fastening bolt to the guide roller unit 15 can be avoided.

A second embodiment of the step device for the vehicle will be explained with reference to FIG. 5 as follows. According to the second embodiment, primarily, a construction of a lower rail is different from the first embodiment. Explanations for the structure common to the first embodiment will not be repeated.

Figure 5:
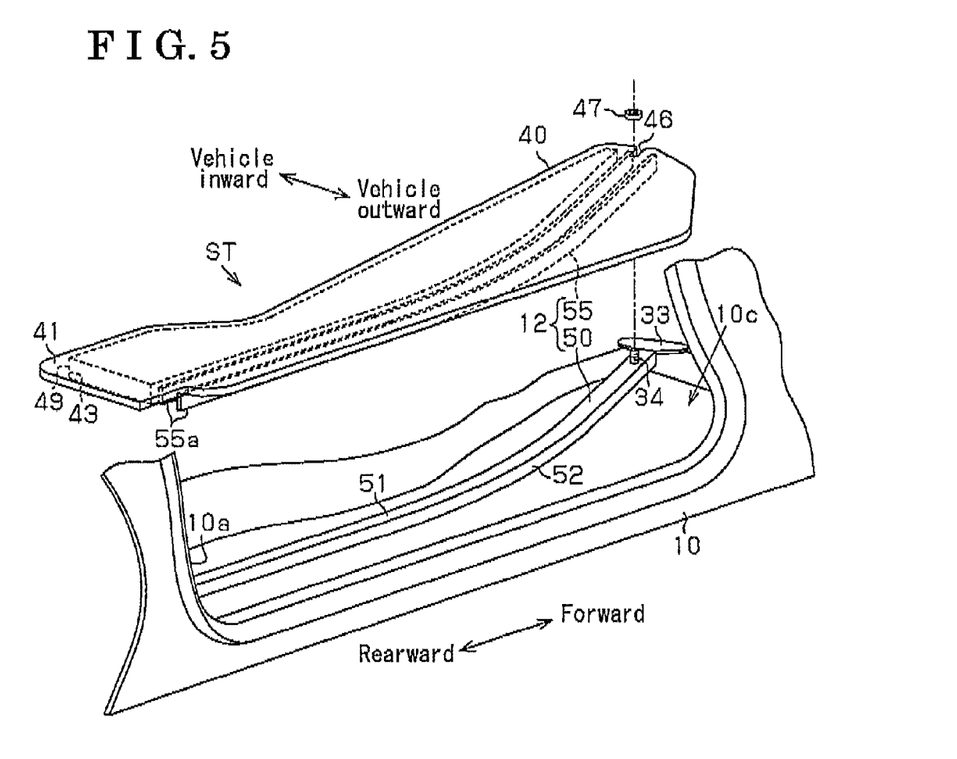
FIG. 5 is an exploded perspective view of the step device for the vehicle according to a second embodiment.

As illustrated in FIG. 5, a rail portion 50 made of metal and secured to the vehicle body 10 extends in a front-rear direction over the substantially entire length of the lower rail 12 in a longitudinal direction. The rail portion 50 includes a cover wall portion 51 formed in an elongated shape and extending in a front-rear direction and a pair of side wall portions 52 extending downwardly from opposite side ends of the cover wall portion 51 facing each other and spaced apart from one another in a vehicle width direction, respectively.

The step main body 40 includes a rail fitting portion 55 that protrudes downwardly from the step panel 41. The rail fitting portion 55 extends in a front-rear direction over the substantially entire length of the rail portion 50 in the front-rear direction. The rail fitting portion 55 includes a pair of support wall portions 55a that sandwich the rail portion 50 in the vehicle width direction. The step main body 40 is fixed to and supported by the rail portion 50 by fitting the rail fitting portion 55 onto an outer surface of the rail portion 50.

The guide roller unit 15 sliding on the lower rail 12 always slides on inner side surfaces of the side wall portions 52 (surfaces facing one another). The rail portion 50 and the rail fitting portion 55 cooperate one another and structure the lower rail 12. The rail portion 50 extends in the front-rear direction over the substantially entire length of the lower rail 12 in the longitudinal direction as described above.

According to the construction of the second embodiment, provided that the rail portion 50 is secured at least to the vehicle body 10, the slide door 20 is assumed to be capable of opening and closing from the fully closed state to the fully open state. A thickness of the rail portion 50 is set at a level of the minimum strength (set on the basis of the minimum strength) that can guide the slide door 20 to move temporarily even before the rail fitting portion 55 is fitted. In other words, the strength that can guide the slide door 20 to move in a normal use is ensured in a state where the rail portion 50 and the rail fitting portion 55 is fitted to one another.

As described above, according to the second embodiment, advantages and effects in addition to the first, second, sixth, seventh, eight, and ninth advantages and effects of the first embodiment can be attained.

First, according to the construction of the second embodiment, because the rail portion 50 allows to guide the slide door 20 to move over the entire range of the opening and closing operation as it is, for example, the slide door 20 can be moved from the fully closed state to the fully open state during the coating process, thus, the coating operation can be further smoothly performed.

Second, according to the construction of the second embodiment, because the precision when assembling the slide door 20 in a well-fitting manner basically does not change throughout the entire range of the opening and closing operation of the slide door 20, the operation time for fine adjustment of the assembling in a well-fitting state thereafter can be further reduced.

The embodiments of the step device for vehicle may be modified as follows.

Figure 6:
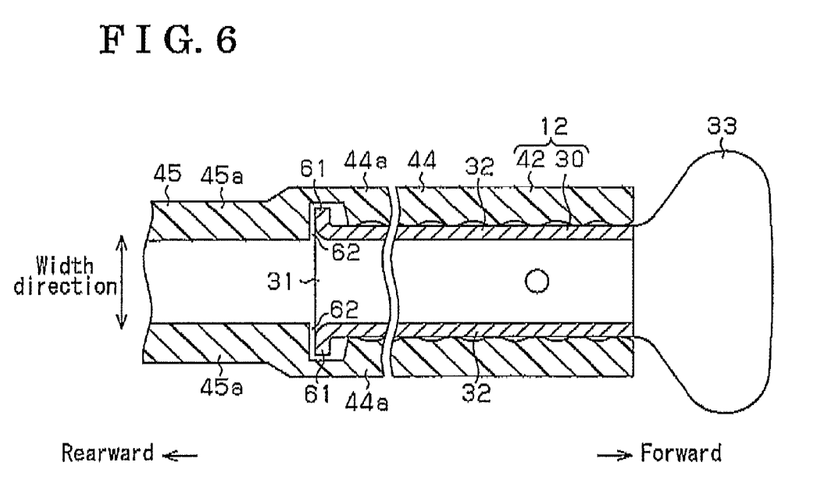
FIG. 6 is a cross-sectional view of a modified example of the first embodiment disclosed here.

As illustrated in FIG. 6, according to an alternative construction of the first embodiment, each rear portion of the side wall portions 32 may be directed towards opposite directions from one another in the vehicle width direction so that a step that protrudes stepwise in the vehicle width direction is not generated by a rear end surface of each of the side wall portions 32 at a border portion between the rail portion 30 and the resin-made rail portion 45. That is, a pair of bent portions 61 is formed. Each of the bent portions 61 is formed continuously, or seamlessly from a rear end of the side wall portion 32 and the bent portions 61 extend in opposite directions from one another in the vehicle width direction. Each of the bent portions 61 is formed by bending a rear portion of the side wall portion 32, and thus the rear end surface of the side wall portion 32 curves in an arc shape in cross section.

On the other hand, a pair of housing portions 62 recessed in opposite directions from one another in the vehicle width direction and each accommodating the bent portion 61 is formed at the rail fitting portion 44. Each rear end surface of the side wall portions 32 (bent portions 61) contacts or is positioned close to a rear end surface of the housing portion 62 (i.e., for the explanatory purpose, a clearance is emphasized in FIG. 6).

According to the construction illustrated in FIG. 6, the rail portion 30 continues from the resin-made rail portion 45 at a rear end of the side wall portions 32 that continues to the bent portions 61 which are accommodated in the housing portions 62, respectively. Accordingly, the generation of sharp step by the side wall portions 32 between the inner surface of the rail portion 30 (side wall portions 32) and the resin-made rail portion 45 can be avoided, and thus the lower rail 12 allows to more smoothly guide the slide door 20 in the opening and closing operation.

According to an alternative construction of the first embodiment, a separate bracket (cover member) for temporarily close a rear end (rear opening portion) of the rail portion 30 may be provided so that the guide roller unit 15 does not drop, or come off from a rear end of the rail portion 30 when moving the slide door 20 in the range of the rail portion 30. In those circumstances, the rear end (rear opening portion) of the rail portion 30 may be closed by a jig used in the process using, for example, the stud bolt (positioning portion) 34.

According to an alternative construction of the first embodiment, for example, when the rail fitting portion 44 and the rail portion 30 are fitted to each other by inserting the rail portion 30 into the rail fitting portion 44 from the vehicle rearward, the rail fitting portion 44 does not necessarily extend over the substantially entire range, or length of the rail portion 30 in the front-rear direction. Notwithstanding, it is necessary to devise so that the rail fitting portion 44 overlaps with the rail portion 30 (cover wall portion 31 and side wall portions 32) at the position of the guide roller unit 15 when the slide door 20 is at the fully closed state so that adequate support strength by the lower rail 12 is ensured at the position of the guide roller unit 15 when the slide door 20 is in the fully closed state.

According an alternative construction of the first embodiment, the range that the rail portion 30 extends can be modified as long as the predetermined precision can be ensured when assembling the slide door 20 in a well-fitting manner and as long as an opening amount of the slide door 20 through which the coating gun can move back-and-forth can be ensured at the coating process thereafter.

According to an alternative construction of the second embodiment, a multipurpose nut that requires the rotation for fastening may be adopted as the nut 47.

According to an alternative construction of the second embodiment, in a case where the rail portion 50 extending in the front-rear direction over the substantially entire length of the lower rail 12 in the longitudinal direction is adopted, instead of the stud bolt 34, or in addition to the stud bolt 34, a positioning portion (e.g., stud bolt) may be provided at a middle portion of the rail portion 50 in the longitudinal direction. Further, in a case where the stud bolt serves as the positioning portion, it is favorable that a quick nut is adopted for fastening the step main body 40. However, the use of the quick nut is not limited, and a multipurpose nut that requires the rotation when fastening, or tightening may be adopted.

According to an alternative construction of the second embodiment, the support wall portions 55a of the rail fitting portion 55 may include or may not include a concave-convex portion that is formed to recess and protrude in the vehicle width direction and partially contacts the outer surface of the side wall portions 52 (rail portion 50) with pressure.

According to an alternative construction of the first and second embodiments, a pin shaped structure or a recessed structure (e.g., hole) may be adopted as the positioning portion.

According to an alternative construction of the first and second embodiments, the positioning portion (e.g., stud bolt) may be positioned at the attachment portion 33.

According to the first and second embodiments, the stud bolt 34 for fastening the step main body 40 serves as the positioning portion. Alternatively, a specialized positioning portion (e.g., pin shaped structure) may be provided separately from the stud bolt 34. Further, alternatively, the positioning portion may be omitted.

According to the embodiments of the step device for the vehicle, the rail fitting portion includes the concave-convex portion that partially contacts the outer surface of the rail portion with pressure. According to this construction, by partially contacting the outer surface of the rail portion via the concave-convex portion with pressure, the rail fitting portion is firmly connected to the rail portion while restraining the deformation of the rail portion.

According to the construction of the disclosure, the step device for a vehicle includes the step member (ST) configured to be provided at the vehicle body (10), the drive member (49) provided at the step member (ST) and configured to be linked to the slide door (20) opening and closing the door opening (10a) formed at the vehicle body (10), the drive member (49) configured to drive the slide door (20) to open and close, the step member (ST) including the metal-made rail portion (30, 50) configured to be fixed to the vehicle body (10) and configured to guide the slide door (20) to move at an opening and closing operation of the slide door (20), and the step member (ST) including the resin-made step main body (40) integrally including the step panel (41) configured to serve as a foot step for a passenger that ingresses and egresses through the door opening, the rail fitting portion (44, 55) protruding from the step panel (41) to be fitted onto an outer surface of the rail portion (30, 50), and the drive member setting portion (43) to which the drive member (49) is set. The resin-made step main body (40) and the metal-made rail portion (30, 50) form the guide rail (12). The guide rail (12) is configured to guide the slide door (20) to move over the entire range of the opening and closing operation of the slide door (20).

According to the construction of the disclosure, the step member (ST) includes the metal-made rail portion (30, 50) and the resin-made step main body (40) separately formed from the rail portion (30, 50). The rail portion (30, 50) fixed to the vehicle body (10) guides the slide door (20) to move at the opening and closing operation of the slide door (20) as it is. That is, by fixing only the rail portion (30, 50) to the vehicle body (10) that is in the metal plate state, the slide door (20) can be assembled in a well-fitting manner with the predetermined precision prior to the coating process (from the electrodeposition coating process to the finish coating process) at the vehicle manufacturer. Then, after the completion of the coating process, by fitting the rail fitting portion (44, 55) of the step main body (40) to which the drive member (49) is pre-mounted onto the outer surface of the rail portion (30, 50), the guide rail is structured together with the rail portion (30, 50). Thus, the mounting operation of the step device for the vehicle is completed. Accordingly, because operations for replacing the parts is not necessary, the operation time for mounting the step device for the vehicle to the vehicle body (10) can be further reduced. Further, because the precision when assembling the slide door (20) in a well-fitting manner basically does not change, the operation time for the fine adjustment of the assembling of the slide door (20) in a well-fitting manner thereafter can be reduced.

According to the construction of the disclosure, the rail portion (30, 50) includes the positioning portion (stud bolt 34) serving as a reference point for determining the positional relationship with the step main body (40).

According to the construction of the disclosure, the positional relationship of the rail portion (30, 50) and the step main body (40) can be determined by the positioning portion (stud bolt 34), the changes in the precision of the assembling of the slide door (20) in a wall-fitting manner after attaching the step main body (40) can be restrained.

According to the construction of the disclosure, the positioning portion (stud bolt 34) corresponds to a fastening member extending in an upward-downward direction of the vehicle. The step main body (40) includes the positioning groove (46) provided at a front end portion of the step main body (40), the positioning groove (46) allowing the fastening member to be inserted therethrough and for moving the fastening member along an extending direction of the rail portion (30, 50).

According to the construction of the disclosure, because the position of the step main body (40) in a front-rear direction is adjustable relative to the rail portion (30, 50) within a range of the positioning groove (46) through which the fastening member (stud bolt 34) can be inserted, the step main body (40) can be fixed to the rail portion (30) more smoothly while absorbing assembly error of the step main body (40) and the rail portion (30). Further, even when the step main body (40) having different linear coefficient of expansion from the rail portion (30) made of metal expands and contracts by, for example, thermal expansion relative to the rail portion (30), the expansion and contraction can be absorbed within the range of the positioning groove (46).

According to the construction of the disclosure, the rail portion (30) extends in a part of the range of the guide rail and guides the slide door (20) within a part of the range of the opening and closing operation of the slide door (20).

According to the construction of the disclosure, because the rail portion (30) extends only in a part of the guide rail (12), the amount of the metal member (rail portion) used can be reduced compared to the construction that, for example, the rail portion extends over a substantially entire range (length) of the guide rail, and thus the weight can be further reduced for the construction with the predetermined strength.

According to the construction of the disclosure, the rail portion (50) guides the slide door (20) to move in the entire range of the opening and closing operation of the slide door (20).

According to the construction of the disclosure, because the rail portion (50) can guide the slide door (20) to move over the entire range of the operating and closing operation of the slide door (20) as it is, for example, the slide door (20) can be moved from the fully closed state to the fully open state, for example, in the coating process, and the coating operation can be more smoothly performed.

According to the construction of the disclosure, the rail portion (30) includes a pair of side wall portions (32) facing each other and each extending in a front-rear direction of the vehicle. The rail portion (30) includes the resin-made rail portion (45) serving as the guide rail that the step main body (40) structures and a pair of bent portions (61) each formed continuously from an end of the side wall portion (32) at the border portion of the rail portion (30) and the resin-made rail portion (45), the bent portions (61) extending in opposite directions in a vehicle width direction. The rail fitting portion (44) is formed with a pair of housing portions (62) recessed in opposite directions from one another in the vehicle width direction and each accommodating each of the bent portions (61).

According to the construction of the disclosure, the ends of the side wall portions (32) continuously formed with the bent portions (61) that are accommodated in the housing portions (62), respectively, continue to the resin-made rail portion (45). Thus, the generation of the sharp step by the end of the side wall portions (32) between the inner surface of the rail portion (side wall portions 32) and the inner surface of the resin-made rail portion (45) that structure the guide rail (lower rail 12) can be avoided. Accordingly, the guide rail (lower rail 12) can guide the slide door (20) to move at the opening and closing operation (to open and close) more smoothly.

According to the construction of the disclosure, the rail fitting portion (44) includes the recess-protrusion portion (concave-convex portion 44b) that partially contacts the outer surface of the rail portion (30) with pressure.

According to the construction of the disclosure, by partially contacting the outer surface of the rail portion (30) via the recess-protrusion portion (concave-convex portion 44b) with pressure, the rail fitting portion can be connected to the rail portion (30) firmly while restraining the rail portion from deforming.

According to the construction of the disclosure, the operation time for mounting the step device for the vehicle onto the vehicle body can be further reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A step device for a vehicle, comprising:
a step member configured to be provided at a vehicle body;
a drive member provided at the step member and configured to be linked to a slide door opening and closing a door opening formed at the vehicle body, the drive member configured to drive the slide door to open and close;
the step member including a metal-made rail portion configured to be fixed to the vehicle body and configured to guide the slide door to move at an opening and closing operation of the slide door, and the step member including a resin-made step main body integrally including a step panel configured to serve as a foot step for a passenger that ingresses and egresses through the door opening, a rail fitting portion protruding from the step panel to be fitted onto an outer surface of the rail portion, and a drive member setting portion to which the drive member is set; wherein
the resin-made step main body and the metal-made rail portion form a guide rail;
the guide rail is configured to guide the slide door to move over an entire range of the opening and closing operation of the slide door;
the rail portion includes a positioning portion serving as a reference point for determining a positional relationship with the step main body;
the positioning portion corresponds to a fastening member extending in an upward-downward direction of the vehicle; and
the step main body includes a positioning groove provided at a front end portion of the step main body, the positioning groove allowing the fastening member to be inserted therethrough and for moving the fastening member along an extending direction of the rail portion.

2. The step device for the vehicle according to claim 1, wherein the rail portion extends in a part of a range of the guide rail and guides the slide door within a part of the range of the opening and closing operation of the slide door.

3. The step device for the vehicle according to claim 1, wherein the rail portion guides the slide door to move in the entire range of the opening and closing operation of the slide door.

4. The step device for the vehicle according to claim 2, wherein the rail portion includes a pair of side wall portions facing each other and each extending in a front-rear direction of the vehicle;
the rail portion includes a resin-made rail portion serving as the guide rail that the step main body structures and a pair of bent portions each formed continuously from an end of the side wall portion at a border portion of the rail portion and the resin-made rail portion, the bent portions extending in opposite directions in a vehicle width direction; and
the rail fitting portion is formed with a pair of housing portions recessed in opposite directions from one another in the vehicle width direction and each accommodating each of the bent portions.

5. The step device for the vehicle according to claim 1, wherein the rail fitting portion includes a recess-protrusion portion that partially contacts the outer surface of the rail portion with pressure.

6. A step device for a vehicle, comprising:
a step member configured to be provided at a vehicle body;
a drive member provided at the step member and configured to be linked to a slide door opening and closing a door opening formed at the vehicle body, the drive member configured to drive the slide door to open and close;
the step member including a metal-made rail portion configured to be fixed to the vehicle body and configured to guide the slide door to move at an opening and closing operation of the slide door, and the step member including a resin-made step main body integrally including a step panel configured to serve as a foot step for a passenger that ingresses and egresses through the door opening, a rail fitting portion protruding from the step panel to be fitted onto an outer surface of the rail portion, and a drive member setting portion to which the drive member is set; wherein
the resin-made step main body and the metal-made rail portion form a guide rail;

the guide rail is configured to guide the slide door to move over an entire range of the opening and closing operation of the slide door; and the rail portion extends in a part of a range of the guide rail and guides the slide door within a part of the range of the opening and closing operation of the slide door.

7. A step device for a vehicle, comprising:

a step member configured to be provided at a vehicle body;

a drive member provided at the step member and configured to be linked to a slide door opening and closing a door opening formed at the vehicle body, the drive member configured to drive the slide door to open and close;

the step member including a metal-made rail portion configured to be fixed to the vehicle body and configured to guide the slide door to move at an opening and closing operation of the slide door, and the step member including a resin-made step main body integrally including a step panel configured to serve as a foot step for a passenger that ingresses and egresses through the door opening, a rail fitting portion protruding from the step panel to be fitted onto an outer surface of the rail portion, and a drive member setting portion to which the drive member is set; wherein the resin-made step main body and the metal-made rail portion form a guide rail;

the guide rail is configured to guide the slide door to move over an entire range of the opening and closing operation of the slide door; and the rail fitting portion includes a recess-protrusion portion that partially contacts the outer surface of the rail portion with pressure.

* * * * *